United States Patent [19]

Pufpaff

[11] Patent Number: 4,823,978
[45] Date of Patent: Apr. 25, 1989

[54] PLASTIC HOLE PLUG WITH SELF-PIERCING POINT

[75] Inventor: Frederick J. Pufpaff, Loudonville, N.Y.

[73] Assignee: Simmons Fastener Corporation, Albany, N.Y.

[21] Appl. No.: 95,523

[22] Filed: Sep. 11, 1987

[51] Int. Cl.⁴ ............................................. B65D 39/04
[52] U.S. Cl. .................................... 220/307; 312/214; 411/451; 411/496; 411/908; 411/509
[58] Field of Search ................ 411/452, 450, 451, 29, 411/30, 494, 496, 907, 908, 508–510; 312/214, 116; 24/297, 453; 220/307, 306, 467

[56] References Cited

U.S. PATENT DOCUMENTS

| | | | |
|---|---|---|---|
| 2,780,128 | 2/1957 | Rapata | 411/510 |
| 2,896,889 | 7/1959 | Herschberger et al. | 411/908 X |
| 3,177,540 | 4/1965 | Hall et al. | 411/508 |
| 3,316,861 | 5/1967 | Dailey | 411/908 X |
| 3,412,437 | 11/1968 | Bennett | 411/509 |
| 3,954,243 | 5/1976 | Sharp et al. | 248/235 |
| 4,195,888 | 4/1980 | Squire | 312/214 |
| 4,262,701 | 4/1981 | Beacom | 220/307 X |
| 4,456,417 | 6/1984 | Schlein | 411/496 X |
| 4,534,088 | 8/1985 | Ricke | 24/295 |
| 4,583,654 | 4/1986 | Pufpaff et al. | 220/307 |

FOREIGN PATENT DOCUMENTS

| | | | |
|---|---|---|---|
| 216957 | 4/1957 | Australia | 411/908 |
| 132373 | 6/1929 | Switzerland | 411/496 |
| 1020694 | 2/1966 | United Kingdom | 411/510 |
| 2020733 | 11/1979 | United Kingdom | 411/508 |

Primary Examiner—Lloyd A. Gall
Assistant Examiner—Curtis B. Brueske
Attorney, Agent, or Firm—Eliot S. Gerber

[57] ABSTRACT

A plastic resin hole plug to fill a hole in a flat thin panel comprises a one-piece unitary injection-molded plastic member having a top closure wall whose bottom surface has a flat edge which rests on the panel. In one embodiment the plug has a cruciform shank portion which extends from the top closure wall portion, the shank portion having a plurality of ribs which retain the plug in the hole. In another embodiment the shank has an elongated hollow cavity and a flat-sided chisel-like point.

2 Claims, 2 Drawing Sheets

4,823,978

PLASTIC HOLE PLUG WITH SELF-PIERCING POINT

BACKGROUND OF THE INVENTION

The present invention relates to industrial fasteners and more particularly to a plastic hole plug (closure plug) used to close a hole in a wall panel which is backed by tape and foam insulation.

In the manufacture of various panels, especially thin plastic panels and sheet metal panels, holes are formed in the panel which are later to be filled by a screw, rivet or other fastener. However, frequently, the holes are left empty. For example, a refrigerator body consists of a thin interior plastic panel wall and an outer wall of metal. The space between them is filled with a solid plastic foam. This type of refrigerator wall construction is called a "foamed-in-place" construction because the foam is inserted, while in its liquid state, between the inner panel and the outer wall. The inner panel is formed with a series of holes, for example, the holes are located to receive screws to attach shelves or devices such as ice makers. If one or more devices are omitted, for example, the device may be an optional device which is not selected, the panel would be left with an empty hole. Generally, the hole should be closed, so that the panel may have a better appearance and to prevent the passage of moisture or dirt. The hole is covered by an adhesive tape and is backed by plastic foam.

A hole plug must be able to be retained in the panel; for example, it should stay in its hole after being installed even though the panel may vibrate or objects may be bumped against the plug. It is possible, but labor intensive and time consuming, to punch a hole in the tape and the foam behind the empty hole with with an awl or other sharp pointed tool and then to insert a hole plug. Preferably, however, the hole plug should be sufficiently sharp and stiff so that it forms its own hole in the foam, which requires only the one action of inserting the hole plug. The plug must be able to fit in holes which are not exactly round and in holes which are "off-size", i.e., either too big or too little for the exact diameter of the plug. Some hole plugs, which are satisfactory in other respects, may be expensive because they utilize an excessive amount of plastic resin or because their design requires expensive manufacturing techniques.

OBJECTIVES AND FEATURES OF THE INVENTION

It is an objective of the present invention to provide a plastic hole plug which may be inserted, by hand, through a panel wall hole covered by a tape and into a solid plastic foam without the necessity of pre-forming a hole in the tape and the foam.

It is a further objective of the present invention to provide such a hole plug which may be inserted into a hole with relatively consistent snap-in pressure even though the holes may differ slightly in diameter, i.e., the holes are "out of tolerance" and which will be firmly retained in the holes.

It is a further objective of the present invention to provide such a hole plug which may be economically manufactured using conventional machinery and techniques and will be firmly retained in its hole and resist accidental dislodgement from its hole.

It is a feature of the present invention to provide a hole plug which is a unitary one-piece injection-molded plastic resin member.

DETAILED DESCRIPTION OF THE DRAWINGS

Other objectives and features of the present invention will be apparent from the following detailed description, taken in conjunction with the accompanying drawings.

DETAILED DESCRIPTION OF THE INVENTION

Figure 1:
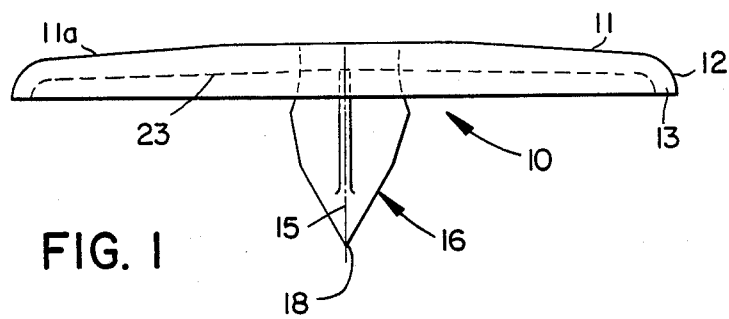
FIG. 1 is a side plan view of the hole plug of the first embodiment of the present invention.

The present invention is of a hole plug which is formed as a unitary one-piece member from molten plastic resin by injection-molding. The design of the hole plug permits a plurality, for example, a dozen, plugs to be molded simultaneously in one mold, permitting high-speed manufacture. The hole plug is formed with relatively thin walls, so as to economize the use of the plastic resin, and yet is relatively strong because of its design. The plastic resin is somewhat flexible and the preferred plastic resin is white low-density polyethylene.

As shown in FIGS. 1-4, the hole plug 10 of the first embodiment has a top wall 11 which, at its outer face 11a, has a slightly curved dome shape and is round in cross-section. Preferably the diameter of the top wall 11 is 1.625 inches. The wall 11 has a curved edge lip 12 formed on a radius, preferably a radius of 0.093 inch. The lip 12 leads to a bottom circular ledge 13. The ledge 13 is flat and perpendicular to the imaginary central axis 15 of the plug 10. The ledge 13 is preferably 0.0315 inch in width. The ledge is adapted to rest with face-to-face contact on the outer face of the panel. The preferred minimum thickness of the top wall 11 is 0.030 inch.

A self-piercing cruciform portion 16 is integral with the top wall 11. The self-piercing portion has four outwardly extending wing-like ribs 17a-17d which are evenly spaced about the imaginary axis 15. Each rib 17a-17d is preferably 0.062 inch in thickness. The ribs may be more or less than four in number; for example three or six ribs may be used.

Figure 10:
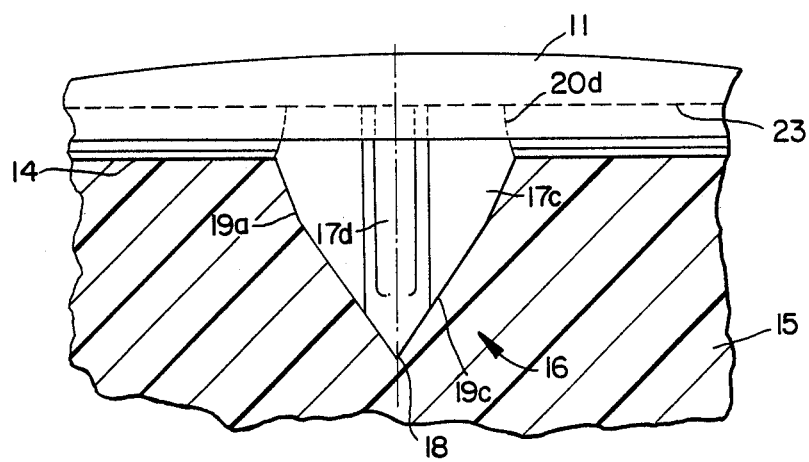
FIG. 10 is a view similar to FIG. 3 but showing the hole plug installed in a panel backed with plastic foam.

The cruciform portion 16 is centered in relationship to the center of the top wall 11 so that the axis 15 passes through the vertical center of the cruciform portion 16. The cruciform portion terminates in a point 18 at its lower free end. The point 18 is used to penetrate the tape 14 and stiff plastic foam 15, see FIG. 10.

Each of the ribs 17a-17d is shown in side view (see FIG. 3) and has a side free edge 19a-19d which is rounded in cross-section. Each of the ledges 19a-19d (edges 19b, 19c not shown) has an outwardly angled lower portion 20a-20d (portions 20b, 20c not shown) leading from the point 18, at about 45° to the axis 15, and a shorter inwardly angled portion 21a-21d (portions 21b, 21c not shown) at the top of each rib 17a-17d. The merger of the outwardly angled portions 19a-19d and the inwardly angled portions 20a-20d forms an outward protrusion ("high point") 22a-22d (points 22b, 22c not shown) which retains the plug in the hole. The depth (length) of the portions 20a-20d is slightly less than the thickness of the panel in which the hole plug is inserted, and is preferably 0.085 inch.

Figure 2:
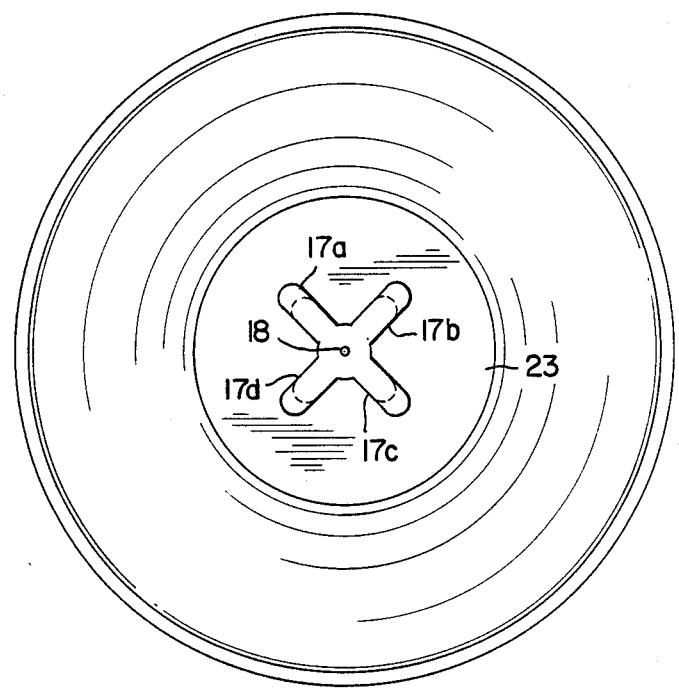
FIG. 2 is a bottom plan view of the hole plug of FIG. 1.
Figure 3:
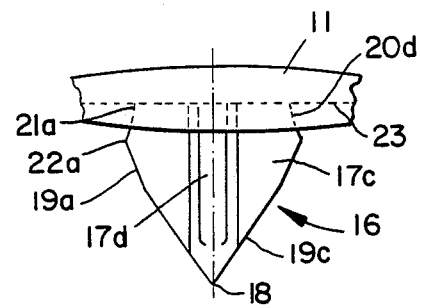
FIG. 3 is an enlarged side plan view of the shaft portion of the hole plug of FIG. 1.
Figure 4:
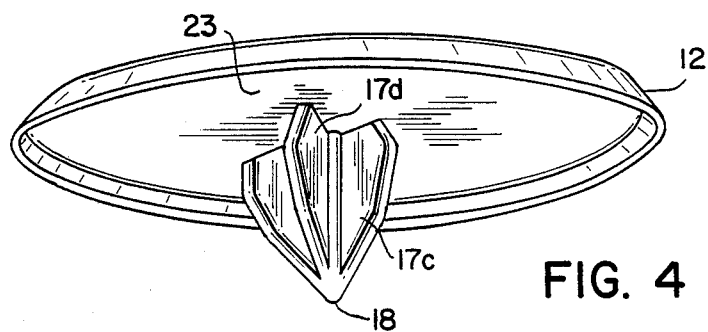
FIG. 4 is a bottom perspective view of the hole plug of FIG. 1.
Figure 5:
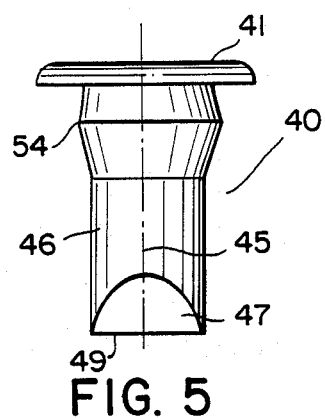
FIGS. 5-7 are side plan views of the hole plug of the second embodiment of the present invention.
Figure 6:
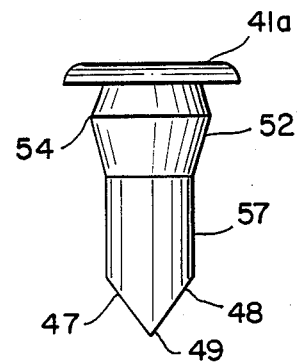
Figure 9:
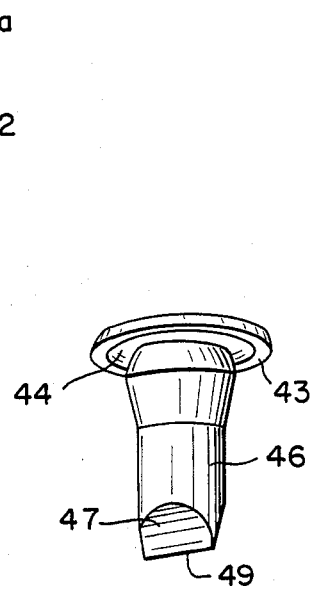
FIG. 9 is a perspective view of the hole plug of FIGS. 5-8.
Figure 7:
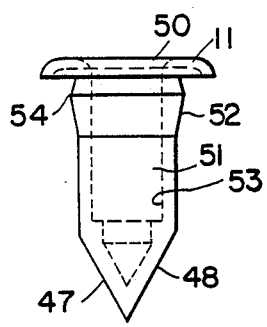
Figure 8:
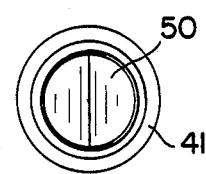
FIG. 8 is a top plan view of the hole plug of FIGS. 5-7

As seen in FIG. 2, the inside face of the top wall 11 has a flat disk-like center 23 which is preferably 0.750 inch in diameter.

As shown in FIGS. 5-8, the hole plug 40 of the second embodiment has a top wall 41, preferably having a diameter of 0.687 inch. The top wall 41 has a curved lip 41a formed on a radius, preferably a radius of 0.062 inch. The top wall 44 has a central opening 50 which is the orifice of an elongated central cavity 51. The lip 41a leads to a bottom circular ledge 43. The ledge 43 is flat and perpendicualr to the imaginary central axis of the plug 40 and has an undercut 44. The ledge 43 is adapted to rest with face-to-face contact on the outer face of the panel. The preferred minimum thickness of the top wall 41 is 0.042 inch.

A self-piercing shank portion 46 is integral with the top wall 11. The shank portion, at its upper end 52, is an annular tube with an inner wall 53 forming the cavity 51, and an outer wall having an annular high point 54. The self-piercing shank portion, at its lower end 57, has two flat inwardly directed sides 47, 48 forming a chisel-like point 49.

What is claimed is:

1. A hole plug which is a unitary one-piece injection-molded plastic resin member adapted to fit into a hole in a panel having a tape closing the hole and plastic foam behind the hole, the plug comprising:
    a top closure wall portion, said top wall portion having a central opening and terminating at its outer edge of the top face in a curved lip and having a bottom support ledge portion which is adapted to rest on the panel face;
    a shank portion extending from the top wall portion and having a central axis;
    the shank portion consisting of an upper section connected to the top wall portion and consisting of an annular tube having an outer wall which is smooth and without protrusions and an inner wall forming an elongated cavity extending from said central opening, the outer wall having an outwardly protruding annular point of greatest diameter, said panel being captured between said point of greatest diameter and said bottom support ledge portion, and a lower section having an outer wall having two opposite inwardly directed flat faces meeting in a chisel point to pierce said tape.

2. A hole plug as in claim 1 wherein said ledge portion is flat and in a plane perpendicular to said axis.

* * * * *